United States Patent
Van Heuklon et al.

(10) Patent No.: US 11,327,824 B2
(45) Date of Patent: May 10, 2022

(54) USING A WEB SERVER TO OBTAIN SERVICE DATA FOR A FAILED SOFTWARE APPLICATION

(71) Applicant: Lenovo Enterprise Solutions (Singapore) Pte. Ltd., Singapore (SG)

(72) Inventors: Jeffery John Van Heuklon, Rochester, MN (US); Alexandru Cozma, Bucharest (RO); Bogdan Popa, Bucharest (RO)

(*) Notice: Subject to any disclaimer, the term of this patent is extended or adjusted under 35 U.S.C. 154(b) by 403 days.

(21) Appl. No.: 16/663,504

(22) Filed: Oct. 25, 2019

(65) Prior Publication Data
US 2021/0124638 A1    Apr. 29, 2021

(51) Int. Cl.
*G06F 11/00* (2006.01)
*G06F 11/07* (2006.01)
*G06F 9/455* (2018.01)

(52) U.S. Cl.
CPC ...... *G06F 11/0787* (2013.01); *G06F 9/45558* (2013.01); *G06F 11/0709* (2013.01); *G06F 11/0751* (2013.01); *G06F 2009/45595* (2013.01)

(58) Field of Classification Search
CPC ............. G06F 11/0787; G06F 11/0709; G06F 11/0751; G06F 11/0766; G06F 11/0712; G06F 11/0706; G06F 11/0703; G06F 11/1484; G06F 11/301; G06F 11/3037; G06F 11/073; G06F 11/0736; G06F 11/143; G06F 11/1479; G06F 11/3013; G06F 11/302; G06F 11/3051
See application file for complete search history.

(56) References Cited

U.S. PATENT DOCUMENTS

2021/0011811 A1* 1/2021 Balcha ................ G06F 11/1456
2021/0406135 A1* 12/2021 Wu ......................... G06F 17/18

* cited by examiner

*Primary Examiner* — Katherine Lin
(74) *Attorney, Agent, or Firm* — Jeffrey L. Streets

(57) ABSTRACT

An apparatus and a computer program product include a non-volatile computer readable medium and non-transitory program instructions embodied therein, the program instructions being configured to be executable by a processor to cause the processor to perform operations. The operations may include running a web server on a virtual machine that is running software application and an operating system that supports the software application, causing the operating system to obtain and provide service data for the software application after failure of the software application, causing the web server to receive the service data from the operating system, and causing the web server to send the obtained service data to an entity that is outside the virtual machine.

20 Claims, 5 Drawing Sheets

USING A WEB SERVER TO OBTAIN SERVICE DATA FOR A FAILED SOFTWARE APPLICATION

BACKGROUND

The present disclosure relates to methods for obtaining service data for a software application that has experienced a failure.

BACKGROUND OF THE RELATED ART

A software appliance includes a software application combined with just enough operating system to support the software application. For example, the software appliance may include an embedded Linux image. Software that is shipped as a software appliance has the advantage that it is more secure. Some software appliances may have Secure Shell (SSH) disabled to prevent unauthorized access to the software appliance. However, when the software application takes a hard failure, the software appliance can make it almost impossible to debug the software application. In the situation of a hard failure, the software application can no longer be accessed either from a browser pointed to the Internet Protocol (IP) address of the application or through the software application's Application Programming Interface (API). Accordingly, there is no available interface that would enable a client to collect service data or allow the owners of the software appliance to debug the issue. Some amount of failure analysis might be facilitated by taking a snapshot of a virtual machine that runs the software appliance, but a virtual machine image can be very large and hard to transfer.

BRIEF SUMMARY

Some embodiments provide a computer program product comprising a non-volatile computer readable medium and non-transitory program instructions embodied therein, the program instructions being configured to be executable by a processor to cause the processor to perform operations. The operations may comprise running a web server on a virtual machine that is running a software application and an operating system that supports the software application, causing the operating system to obtain and provide service data for the software application after failure of the software application, causing the web server to receive the service data from the operating system, and causing the web server to send the service data to an entity that is outside the virtual machine.

Some embodiments provide an apparatus comprising at least one non-volatile storage device storing program instructions, and at least one processor configured to process the program instructions, wherein the program instructions are configured to, when processed by the at least one processor, cause the apparatus to perform operations. The operations may comprise running a web server on a virtual machine that is running a software application and an operating system that supports the software application, causing the operating system to obtain and provide service data for the software application after failure of the software application, causing the web server to receive the service data from the operating system, and causing the web server to send the service data to an entity that is outside the virtual machine.

DETAILED DESCRIPTION

Figure 1:
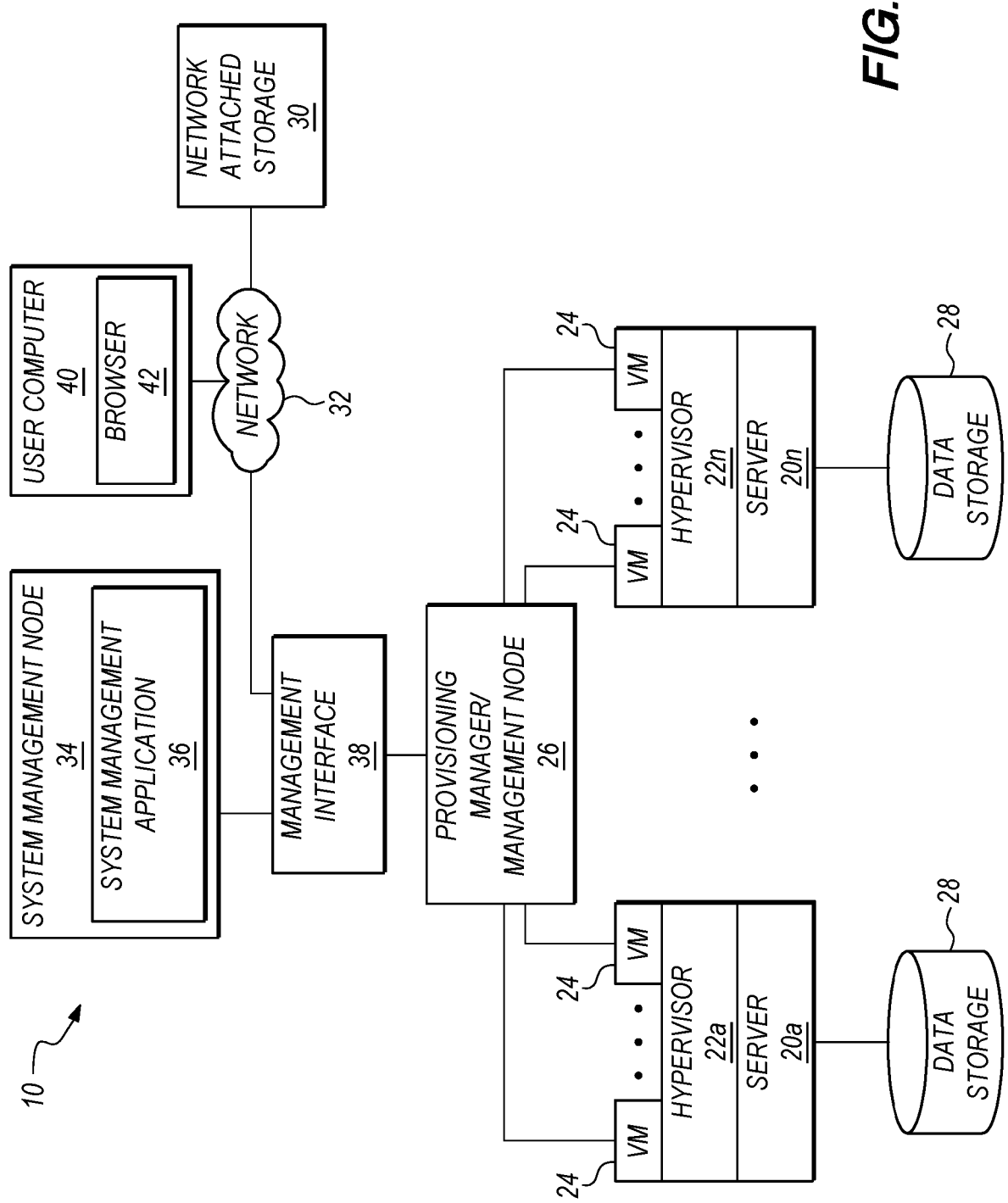
FIG. 1 is a diagram of a computer system that supports the operation of a virtual machine that may run a software application.

Some embodiments provide a computer program product comprising a non-volatile computer readable medium and non-transitory program instructions embodied therein, the program instructions being configured to be executable by a processor to cause the processor to perform operations. The operations may comprise running a web server on a virtual machine that is running a software application and an operating system that supports the software application, causing the operating system to obtain and provide service data for the software application after failure of the software application, causing the web server to receive the service data from the operating system, and causing the web server to send the service data to an entity that is outside the virtual machine.

Some embodiments of the operating system running in the virtual machine may have a cryptographic network protocol, such as Secure Shell (SSH), disabled at the time the software application experiences a failure. Alternatively, the operating system running in the virtual machine may be deployed without cryptographic network protocol functionality or may have all supported cryptographic network protocols disabled. While disabling Secure Shell may prevent unauthorized access to the software application during deployment and normal operation, disabling access via Secure Shell may also make it more difficult to analyze the cause of a software application failure. The web server running within the same virtual machine as the failed software application may be used to obtain a file or part of a file that includes service data for the software application during the time period leading up to a failure of the software application.

A web server is software that can satisfy World Wide Web client requests. In some embodiments, the web server may obtain service data for the software application by requesting the service data from an operating system running on the virtual machine. The operating system may be a full operating system or just enough operating system to support to the software application and web server. In some embodiments, causing the operating system to obtain and provide the service data may comprise instructing the operating system to execute a command on the software application, wherein the service data comprises data that the operating system obtains as a result of executing the command on the software application. The data obtained by executing the command may be different than the service data that describes the operation of the software application.

In some embodiments, the service data for the software application may include operating data for the software application leading up to a failure of the software application. For example, the service data may begin upon the occurrence of some event, such as a detected instability. In another example, the service data may be continuously collected, but older data is discarded when it is no longer relevant to the current operation of the software application. Upon failure of the software application, the service data is no longer discarded such that data for the time period leading up to a failure is captured. Optionally, the service data may be retained for a sliding window of time having a predetermined length. Furthermore, the service data may be stored in a predetermined directory, predetermined file extension, or other identifiable characteristic that allows the operating system to locate the service data. In one example, the service data may be a First Failure Data Capture file.

Some embodiments cause the web server to obtain and send the service data in response to receiving an instruction from a user computer. For example, the user computer may be a computer belonging to the user that launched or owns the software application, or a system management node that is used by a system administrator to manage a computer system within which the virtual machine is run. Alternatively, the web server may send the service data to a process outside the virtual machine where the software application has failed. As a result, the service data is then available as needed from a process that has not experienced a failure.

Some embodiments may cause the web server to generate a user interface page for display on a web browser running on a user computer, and receive user input through the user interface page. The user input may include instructing the web server to obtain service data for the software application and send the obtained service data to the user computer or other destination. Optionally, the operating system may be caused to obtain and provide service data is in response to input received through the user interface page In some embodiments, the web server may not send the service data to the user computer unless the web server receives an access code from the user computer that matches an access code required by the web server. Alternatively, the web server may be caused to send the service data to the user computer in response to receiving an access code from the user computer that matches an access code required by the web server. Other forms of user authentication may performed as a condition to gaining access to the service data. In one option, the web server may obtain an identifier for the software application and generate the required access code by applying a predetermined operation to the identifier. In one non-limiting example, the identifier may be a universally unique identifier and the predetermined operation may be a hash function. Furthermore, the web server may generate the required access code by applying a predetermined operation to the identifier and a current date.

Some embodiments of the computer program product may include program instructions configured to be executable by a processor to cause the processor to run the software application on the virtual machine and/or run the virtual machine on a compute node.

Some embodiments provide an apparatus comprising at least one non-volatile storage device storing program instructions, and at least one processor configured to process the program instructions, wherein the program instructions are configured to, when processed by the at least one processor, cause the apparatus to perform operations. The operations may comprise running a web server on a virtual machine that is running a a software application and an operating system that supports the software application, causing the web server to obtain service data for the software application after failure of the software application, and causing the web server to send the obtained service data to a user computer.

The foregoing apparatus may include further program instructions for implementing or initiating any one or more operation or feature of the computer program products described herein. Accordingly, a separate description of these operations or features will not be duplicated in the context of an apparatus.

FIG. 1 is a diagram of a computer system 10 that supports the operation of a virtual machine that may run a software application. The computer system 10 may provide, or operate in, a "cloud" environment to provide a pool of resources. The computer system 10 includes a plurality of compute nodes, referred to as servers. Each server supports one or more virtual machines (VMs). A virtual machine is a software implementation (emulation) of a physical computer. A single hardware compute node, such as a server, may be able to support multiple virtual machines, where each virtual machine may run the same, different, or shared operating systems. In one embodiment, each virtual machine can be specifically tailored and reserved for executing software tasks: (1) of a particular type (e.g., database management, graphics, word processing etc.); (2) for a particular user, subscriber, client, group or other entity; (3) at a particular time of day or day of week (e.g., at a permitted time of day or schedule); etc.

As shown in FIG. 1, the computer system 10 includes a plurality of servers 20a-20n (where "a-n" indicates an integer number of servers). Each server runs a hypervisor 22a-22n that supports one or more virtual machines (VMs) 24. The servers are coupled to a management node 26, which may operate a provisioning manager that assists with launching the virtual machines 24 and/or workloads, such as a software application, to be run in the virtual machines.

Furthermore, each server 20a-n is shown having access to some type of data storage device 28, although the data storage device may be internal to the server, directly connected external to the server, or remotely accessible to the server. Guest software applications, operating systems, web servers or other applications may, for example, be stored on a data storage device 28 or remotely on the network attached storage 30 such that data may be transmitted to one of the storage devices 28 over the network 32 as needed. The network 32 may be a public network (e.g., the Internet) or a private network (e.g., a virtual private network or a local area network).

A system management node 34 is coupled to the management node 26 through a management interface 38. A system management application 36 running on the system management node 34 may be responsible for launching and managing the virtual machines 24 or the workloads running the virtual machines 24 on a particular one of the servers 20a-n. A virtual machine workload is a software task that may be executed on any of the virtual machines within the computing system using the resources allocated to the virtual machine.

A workload may be submitted from the system management node 34 or from a user computer 40. For example, the user computer 40 may run a browser that can communicate with the management node 26 or the system management node 34 over the network 32. When a workload is submitted, the management node 26 may configure a virtual machine 28 on one of the servers 20a-n to execute the requested software task. Some embodiments may configure a virtual machine to run a software appliance and a web server, where the software appliance includes a software application and an operating system that supports the software application.

Figure 2:
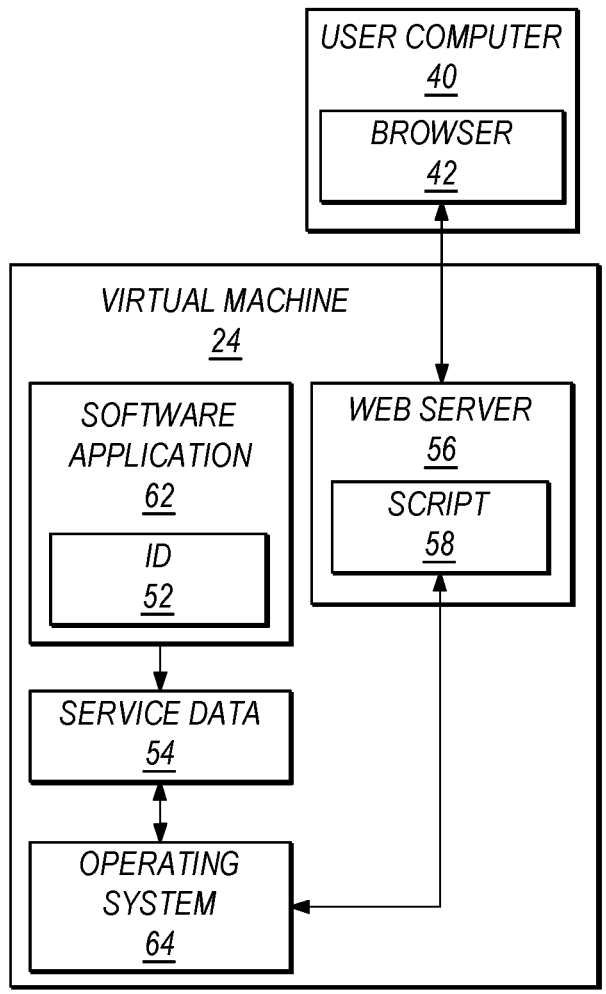
FIG. 2 is a diagram of a virtual machine including a software appliance and web server accessible to a user computer.

FIG. 2 is a diagram of a virtual machine 24 including a software application 62, operating system 64 and web server 56, wherein the web server 56 is accessible to the browser 42 running on the user computer 40. The software application 62 may be identified by an identifier 52 and may generate service data 54 that details the operation of the software application 62. The web server 56 may include a script 58 that may be executed in response to a user instruction entered into the browser 42 and directed to the web server 56. The script 58 may cause the web server 56 to provide instructions to the operating system 64 and receive service data 54 and/or other data from the operating system 64. The service data 54 and/or other data may be forwarded from the web server 56 to the web browser 42 of the user computer 40 or other computer.

Figure 3:
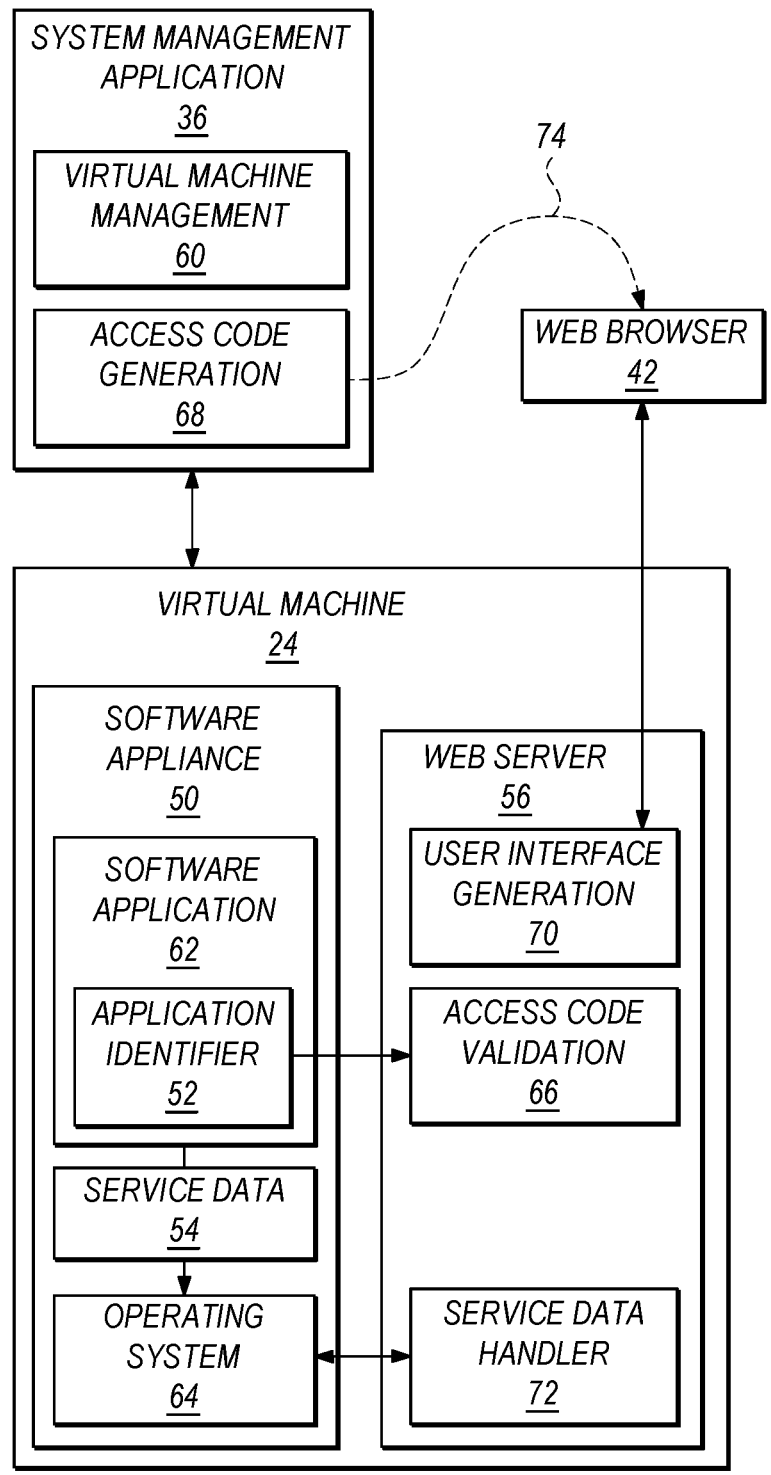
FIG. 3 is a diagram of a virtual machine including a software appliance and a web server.

FIG. 3 is a diagram of the virtual machine 24 in communication with the system management application 36 and the web browser 42 as collectively shown in FIGS. 1 and 2. Furthermore, the virtual machine 24 includes a software appliance 50, which includes the software application 62, operating system 64 and web server 56 as shown in FIG. 2. The web server 56 may be deployed at the same time as the software appliance 50. The virtual machine 24 may be deployed and managed by a virtual machine management module 60 of the system management application 36.

Some embodiments of the software application 62 may be given an application identifier 52, such as a Universally Unique Identifier (UUID), which may be automatically generated by the software application when the software application is started up for the first time. The identifier 52 may be shared with access code validation logic 66 that is part of the web server 56 running in the virtual machine 24 along with the software appliance and may also be shared with access code generation logic 68 that is part of the system management application 36 managing the virtual machine 24. For example, the system management application 36 may be an instance of LENOVO XClarity Administrator system management software. Both the access code validation logic 66 of the web server 56 and the access code generation logic 68 of the system management application 36 may be provided with an identical operation, such as a specific hash function, for generating an access code using the identifier 52 and some other information, such as a current date (i.e., month, day and year). Since the web server and the system management application are provided with the identical operation, they will each be able to generate the same access code when the inputs (i.e., the identifier, etc.) to the operation are the same. Some embodiments of the operation may use the identifier and the current date as inputs, such that the resulting access code is specific to a particular software application 62 associated with the identifier 52 and is valid for only a single day (i.e., until the current date changes).

When the virtual machine 24 is running, user interface generation logic 70 of the web server 56 may form a display on a page in the web browser 42 on the user's console. The page may be specific to the virtual machine 24 and may display the identifier 52 of the software application running on the virtual machine as well as an Internet Protocol address that the software application 62 is running on. The page may further include an input field and some buttons. In some embodiments, a button on the web browser 42 may cause the web server 56 to execute a script, such as the service data handler 72.

Occasionally, a user may determine that the software application 62 is not performing normally, such as when the user interface of the software application fails to respond to user interaction. When the user determines that the software application 62 has experience a failure, the user may request an access code that can be used for a limited time to cause the web server to run a script. For example, the access code may be generated by the management application 36 using the access code generation logic 68. The user may then obtain the access code in any manner, such as via a phone call, text message, email, or web interface with software support personnel that can run the access code generation logic 68. Furthermore, the access code may be obtained through an automated system.

After the user has obtained an access code from the access code generation logic 68 of the system management application 36, the user may enter the access code via the web browser 42 (see dashed arrow 74) into a user interface page of the web server 56 associated with the failed software application 62. The access code validation logic 66 of the web server 56 will then attempt to validate the code. In order to validate the code, the web server must retrieve the application identifier 52 from the software application 62 and generate an access code using the same operation that the access code generation logic 68 used to generate the access code provided to the user. If the code input by the user matches the code generated by the web server 56, then the access code is validated and the web server 56 will enable the service data handler 72. In one example, the service data handler is a script, such as a "bash script" that performs a set of Linux commands.

After validating the access code entered by the user, the service data handler 72 (i.e., the "script") may be run against the failed software application 62 in response to the user clicking on a specific button displayed on the web server's user interface page. The commands within the service data handler 72 (i.e., the "script") instruct the operating system 64 to locate and retrieve service data 54 related to the previous operation and failure of the software application 62. The service data 54 may include logs and/or files that have specific file extensions or are located in specific directories. In one example, the operating system 64 collects the service data 54 in the form of a First Failure Date Capture (FFDC) file that may include a copy of one or more logs and/or files, but may also include output from running some operating system commands. After the service data 54 has been collected, the web server 56 then allows the user to download a copy of the service data to their workstation or user computer. For example, the service data may be downloaded as a zip file or archive file via the web browser 42.

Figure 4:
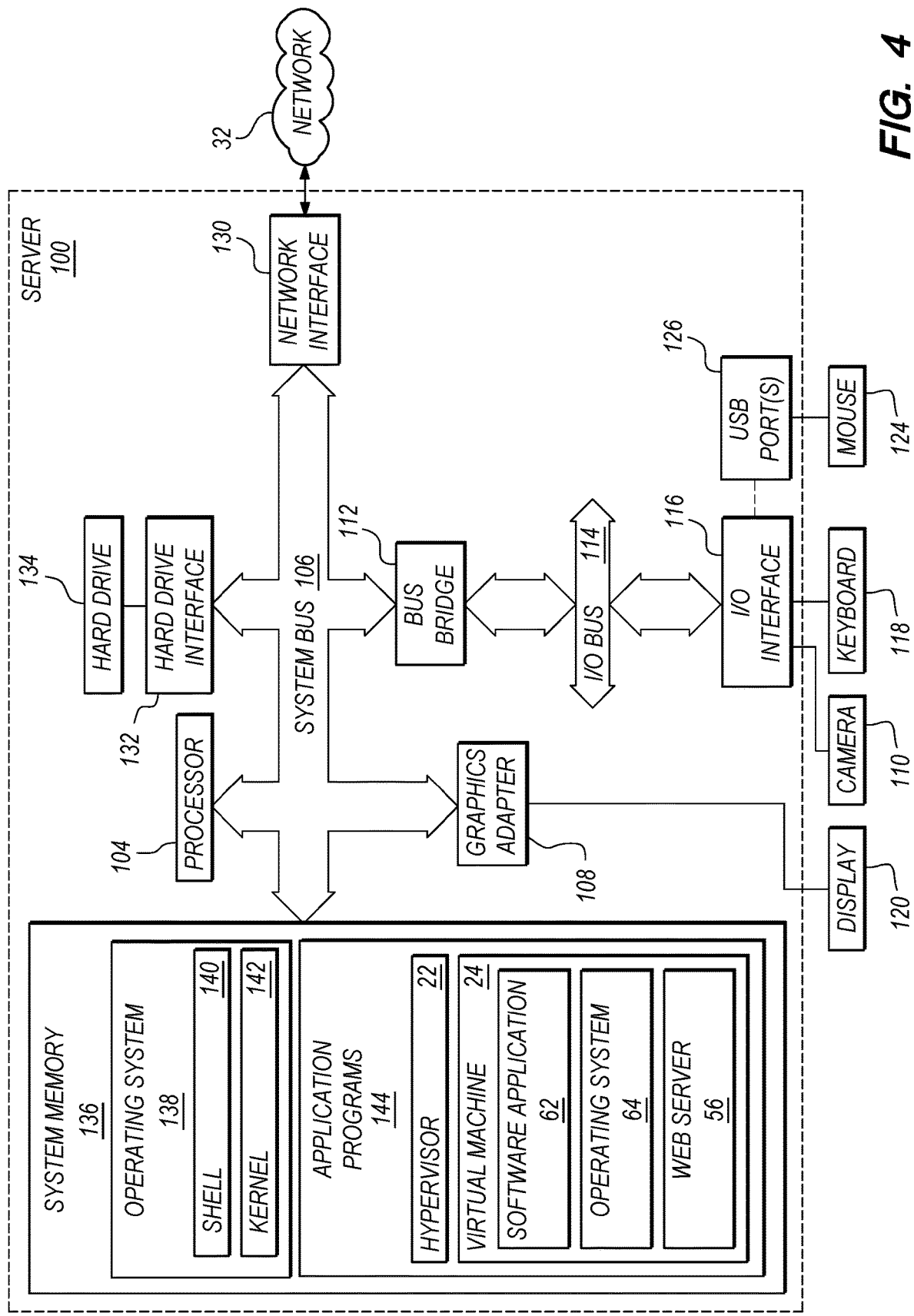
FIG. 4 is a diagram of a server.

FIG. 4 is a diagram of a server 100 that may, without limitation, be representative of the configuration of one of the servers 20a-n of FIG. 1. Furthermore, the architecture of the server 100 may, without limitation, also be generally representative of the hardware architecture of the management node 26, the system management node 34, and/or the user computer 40. However, the embodiments are not limited to the particular architecture shown.

The server 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the server 100 is able to communicate with other network devices over the network 32 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include application programs that include a hypervisor 22 and one or more virtual machine 24, including the software application 62, operating system 64 and web server 56.

The operating system 138 for the server 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. However, the operating system 138 of this representative server 100 should not be confused with the operating system that may be included in the software appliance 50 that may run on a virtual machine 24. For example, each virtual machine may include and run a separate operating system to support a software application and web server that run within the virtual machine.

Figure 5:
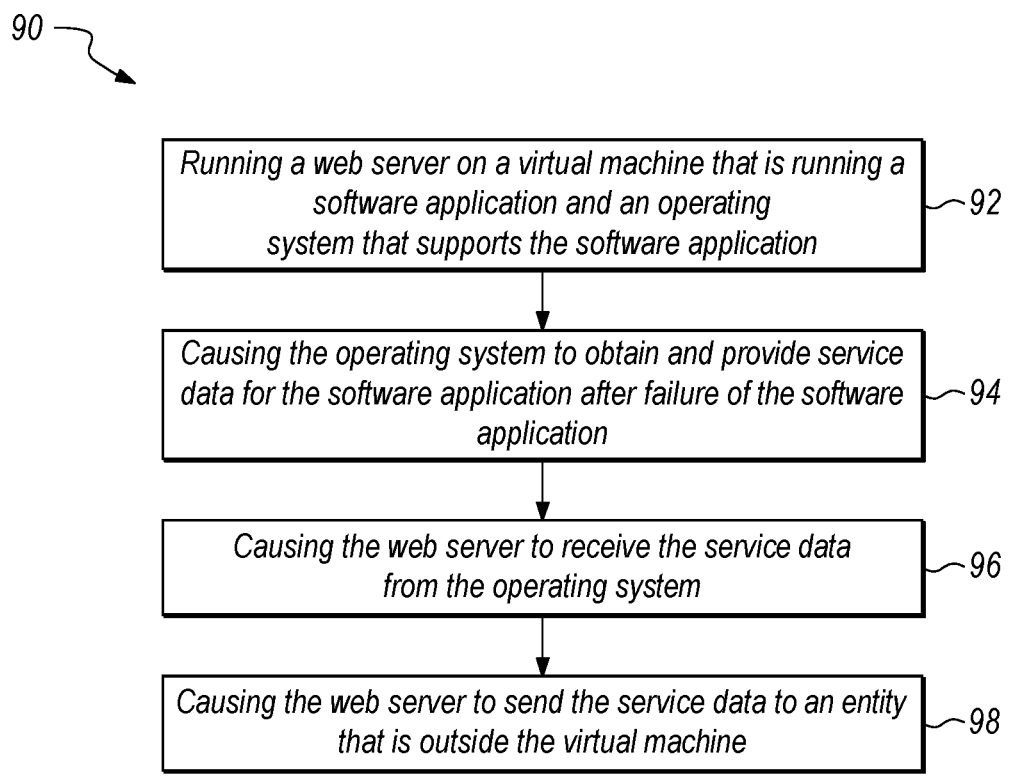
FIG. 5 is a flowchart of operations.

FIG. 5 is a flowchart of operations 90. Operation 92 includes running a web server on a virtual machine that is running a software application and an operating system that supports the software application. Operation 94 includes the operating system to obtain and provide service data for the software application after failure of the software application. Operation 96 includes causing the web server to receive the service data from the operating system. Operation 98 includes causing the web server to send the service data to an entity that is outside the virtual machine.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.)

What is claimed is:

1. A computer program product comprising a non-volatile computer readable medium and non-transitory program instructions embodied therein, the program instructions being configured to be executable by a processor to cause the processor to perform operations comprising:
   running a web server on a virtual machine that is running a software application and an operating system that supports the software application;
   causing the operating system to obtain and provide service data for the software application after failure of the software application;
   causing the web server to receive the service data from the operating system; and
   causing the web server to send the service data to an entity that is outside the virtual machine.

2. The computer program product of claim 1, wherein the operating system does not support a cryptographic network protocol or has all supported cryptographic network protocols disabled.

3. The computer program product of claim 1,
   wherein causing the operating system to obtain and provide the service data comprises instructing the operating system to execute a command on the software application, and
   wherein the service data comprises data that the operating system obtains as a result of executing the command on the software application.

4. The computer program product of claim 1, wherein the service data for the software application includes operating data for the software application leading up to a failure of the software application.

5. The computer program product of claim 4, wherein service data is stored in a predetermined directory.

6. The computer program product of claim 4, wherein the service data is a First Failure Data Capture file.

7. The computer program product of claim 1, wherein the causing the operating system to obtain and provide service data for the software application is in response to receiving an instruction from a user computer.

8. The computer program product of claim 7, the operations further comprising:
   causing the web server to generate a user interface page for display on a web browser running on a user computer,
   wherein the causing the operating system to obtain and provide service data is in response to input received through the user interface page.

9. The computer program product of claim 7, wherein the causing the web server to send the service data comprises causing the web server to send the service data to the user computer in response to receiving an access code from the user computer that matches an access code required by the web server.

10. The computer program product of claim 9, the operations further comprising:
    obtaining an identifier for the software application; and
    generating the required access code by applying a predetermined operation to the identifier.

11. The computer program product of claim 10, wherein the identifier is a universally unique identifier.

12. The computer program product of claim 10, wherein applying a predetermined operation to the identifier comprises applying a predetermined operation to the identifier and a current date.

13. The computer program product of claim 1, wherein the software application and the operating system are included in a software appliance.

14. The computer program product of claim 13, wherein the entity that is outside the virtual machine is a user computer.

15. An apparatus comprising:
    at least one non-volatile storage device storing program instructions; and
    at least one processor configured to process the program instructions, wherein the program instructions are configured to, when processed by the at least one processor, cause the apparatus to perform operations comprising:

running a web server on a virtual machine that is running a software application and an operating system that supports the software application;

causing the operating system to obtain and provide service data for the software application after failure of the software application;

causing the web server to receive the service data from the operating system; and causing the web server to send the service data to an entity that is outside the virtual machine.

16. The apparatus of claim 15, wherein the operating system does not support a cryptographic network protocol or has all supported cryptographic network protocols disabled.

17. The apparatus of claim 15, wherein the service data for the software application includes operating data for the software application leading up to a failure of the software application.

18. The apparatus of claim 15, wherein the causing the operating system to obtain and provide service data for the software application is in response to receiving an instruction from a user computer and receives an access code from the user computer that matches an access code required by the web server.

19. The apparatus of claim 15, the operations further comprising:

causing the web server to generate a user interface page for display on a web browser running on a user computer, wherein the causing the operating system to obtain and provide service data is in response to input received through the user interface page.

20. The apparatus of claim 15, wherein the causing the web server to send the service data comprises causing the web server to send the service data to the user computer in response to receiving an access code from the user computer that matches an access code required by the web server.

* * * * *